(12) United States Patent
Ito et al.

(10) Patent No.: US 12,433,622 B2
(45) Date of Patent: Oct. 7, 2025

(54) FORCEPS AND TISSUE COLLECTION METHOD

(71) Applicant: OLYMPUS MEDICAL SYSTEMS CORP., Tokyo (JP)

(72) Inventors: Ryosuke Ito, Tokyo (JP); Koichiro Ito, Tokyo (JP)

(73) Assignee: OLYMPUS MEDICAL SYSTEMS CORP., Tokyo (JP)

( * ) Notice: Subject to any disclaimer, the term of this patent is extended or adjusted under 35 U.S.C. 154(b) by 815 days.

(21) Appl. No.: 17/709,594

(22) Filed: Mar. 31, 2022

(65) Prior Publication Data

US 2023/0310015 A1     Oct. 5, 2023

(51) Int. Cl.
*A61B 17/28* (2006.01)
*A61B 17/29* (2006.01)

(52) U.S. Cl.
CPC ...... *A61B 17/2816* (2013.01); *A61B 17/2833* (2013.01); *A61B 2017/2901* (2013.01)

(58) Field of Classification Search
CPC ............ A61B 17/2816; A61B 17/2833; A61B 17/2804; A61B 17/285; A61B 2017/2901; A61B 2017/2927; A61B 2017/2936; A61B 10/04; A61B 10/06; A61B 10/0266
See application file for complete search history.

(56) References Cited

U.S. PATENT DOCUMENTS

| | | | |
|---|---|---|---|
| 5,423,855 A | 6/1995 | Marienne | |
| 2019/0282220 A1* | 9/2019 | Purohit | A61B 17/295 |
| 2019/0336157 A1* | 11/2019 | Ahrens | A61B 17/1606 |

FOREIGN PATENT DOCUMENTS

| | | |
|---|---|---|
| JP | H10-501704 A | 2/1998 |
| WO | 1995/021577 A1 | 8/1995 |

OTHER PUBLICATIONS

T. Imabayashi, et al., "Current Status and Prospective of Bronchoscopy for Lung Cancer Diagnosis", Journal of Kyoto Prefectural University of Medicine, 126(9), pp. 601-610, 2017, Journal editorial board of Kyoto Prefectural University of Medicine, Japan.
N. Kurimoto, et al., "EBUS-GS for Peripheral Pulmonary Lesions", Bronchial Branch Tracing, pp. 127-141, Springer, Singapore, Feb. 28, 2020, Online ISBN:978-981-13-9905-3DOI:https://doi.org/10.1007/978-981-13-9905-3_3.

* cited by examiner

*Primary Examiner* — Jennifer Robertson
*Assistant Examiner* — Nidhi N Patel
(74) *Attorney, Agent, or Firm* — Scully, Scott, Murphy & Presser, P.C.

(57) ABSTRACT

Provided are a forceps including: a shaft; a wire that is movable in a longitudinal direction inside the shaft; and a first arm and a second arm, each of which has a first jaw or a second jaw, that are connected to each other in a pivotable manner by means of a third joint. The first arm is connected to a distal end of the shaft in a pivotable manner by means of a first joint, and the second arm is connected to a distal end of the wire in a pivotable manner by means of a second joint. The third joint is provided between the first jaw and the first joint and between the second jaw and the second joint, and is disposed lateral to the wire in a state in which the first and second jaws are open. The first and second jaws are closed while the third joint is moving outward in the lateral direction with respect to the shaft.

7 Claims, 17 Drawing Sheets

FORCEPS AND TISSUE COLLECTION METHOD

TECHNICAL FIELD

The present invention relates to a forceps and a tissue collection method.

BACKGROUND ART

In the related art, there are known surgical forceps having, at a distal end thereof, a pair of jaws for gripping a target object (for example, see Patent Literature 1). Conventional forceps as in Patent Literature 1 are configured so that a pair of jaws open and close in a direction intersecting the longitudinal direction of the forceps and are suitable for gripping a target object disposed in front of the forceps.

CITATION LIST

Patent Literature

{PTL 1} Japanese Translation of PCT International Application, Publication No. Hei 10-501704

SUMMARY OF INVENTION

Technical Problem

FIGS. 12A and 12B explain a method for collecting tissue of a tumor C by using forceps 1' inserted into a bronchial cavity B. As shown in FIG. 12A, in the case in which the tumor C is located in front of the forceps 1', it is possible to collect the tissue by using the conventional forceps 1'. On the other hand, as shown in FIG. 12B, in the case in which the tumor C is located lateral to the forceps 1', it is difficult to collect the tissue by using the conventional forceps 1'.

Solution to Problem

An aspect of the present invention is a forceps including: an elongated shaft; an elongated wire that is disposed inside the shaft and that is movable in the longitudinal direction of the shaft; a first arm that is disposed on a distal side of the shaft and that has a first jaw, the first arm being connected to a distal end of the shaft in a pivotable manner by means of a first joint; and a second arm that is disposed on the distal side of the shaft and that has a second jaw, the second arm being connected to a distal end of the wire in a pivotable manner by means of a second joint, wherein the first arm and the second arm are connected to each other in a pivotable manner by means of a third joint and the third joint is provided between the first jaw and the first joint and between the second jaw and the second joint, movement of the wire causes the second joint to move in the longitudinal direction with respect to the first joint, thereby opening and closing the first jaw and the second jaw with respect to each other, the third joint is disposed lateral to the wire in a state in which the first jaw and the second jaw are open, and the first jaw and the second jaw are closed while the third joint is moved outward with respect to the shaft in the lateral direction of the shaft.

Another aspect of the present invention is a tissue collection method including: inserting the forceps in which the first jaw and the second jaw are open into a sheath disposed inside a body cavity; making the first arm and the second arm protrude from the distal end of the sheath; closing the first jaw and the second jaw to collect tissue by moving the wire in the longitudinal direction; accommodating the first arm and the second arm in which the first jaw and the second jaw are closed in the sheath by pulling the shaft; pulling the forceps out of the sheath; and taking out the tissue from the first jaw and the second jaw by opening the first jaw and the second jaw.

DESCRIPTION OF EMBODIMENT

Figure 1A:
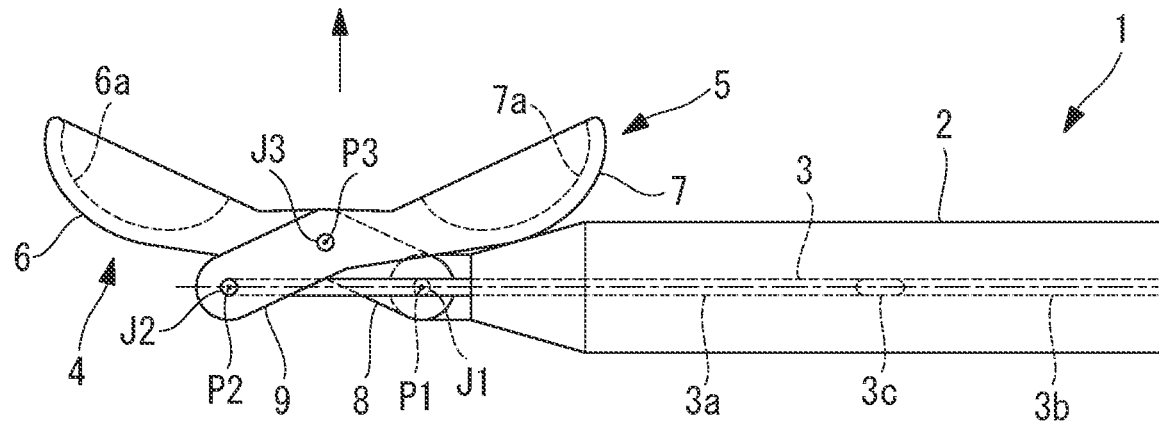
FIG. 1A is a side view of a forceps according to an embodiment of the present invention, showing a pair of arms thereof in an open state.
Figure 1A:
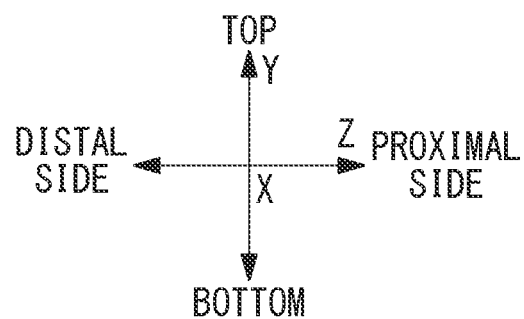

A forceps and a tissue collection method according to an embodiment of the present invention will be described with reference to the drawings.

A forceps 1 according to this embodiment is a biopsy forceps that is inserted into a body cavity and with which tissue is collected. As shown in FIGS. 1A to 10, the forceps 1 includes an elongated, tubular shaft 2, an elongated wire 3 that is disposed in the shaft 2, and a first arm 4 and a second arm 5 that are disposed at a distal end of the shaft 2.

As shown in FIG. 1A, the forceps 1 has a longitudinal direction Z, a top-to-bottom direction Y, and a left-to-right direction X. The longitudinal direction Z is a direction along a center axis (longitudinal axis) A of the shaft 2. The top-to-bottom direction Y and the left-to-right direction X are lateral directions that are respectively perpendicular to the center axis A of the shaft 2 and are perpendicular to each other.

The shaft 2 possesses flexibility and can be inserted into the body cavity while being bent in conformity to the shape of the body cavity.

The wire 3 possesses flexibility, is disposed in the longitudinal direction Z in the shaft 2, and is movable in the longitudinal direction Z with respect to the shaft 2. A proximal end of the wire 3 is connected to a handle (not shown) disposed on a proximal side of the shaft 2. The wire 3 is pushed and pulled in the longitudinal direction Z by operation of the handle by an operator, whereby a pair of jaws 6 and 7 are opened and closed, as described later.

Each of the arms 4 and 5 has a first side and a second side that is an opposite side from the first side. The first arm 4 has the first jaw 6 on the first side and a first linkage 8 on the second side. The second arm 5 has the second jaw 7 on the first side and a second linkage 9 on the second side.

The jaws 6 and 7 are bowl-shaped cups each having a concave surface 6a, 7a. In a closed state (see FIG. 10), described later, the concave surfaces 6a and 7a face each other and form a space for storing tissue on inner sides of the pair of jaws 6 and 7.

The first arm 4 is connected to the distal end of the shaft 2 by means of a first joint J1 so as to be pivotable around a first axis P1. The first axis P1 extends along the left-to-right direction X. The first joint J1 is provided at an end portion of the second side of the first linkage 8 and is placed stationary with respect to the distal end of the shaft 2.

The second arm 5 is connected to a distal end of the wire 3 by means of a second joint J2 so as to be pivotable around a second axis P2. The second axis P2 extends along the left-to-right direction X and is parallel or substantially parallel to the first axis P1. The second joint J2 is provided in an end portion of the second side of the second linkage 9 and is movable with respect to the distal end of the shaft 2 in the longitudinal direction Z and the top-to-bottom direction Y together with the distal end of the wire 3.

The first arm 4 and the second arm 5 are connected by means of a third joint J3 so as to be pivotable around a third axis P3 with respect to each other. The third axis P3 extends along the left-to-right direction X and is parallel or substantially parallel to the axes P1 and P2. The third joint J3 is provided so as to be located between the first jaw 6 and the first joint J1 and between the second jaw 7 and the second joint J2. More specifically, the third joint J3 is provided so as to be located at end portions of the second sides of the respective linkages 8 and 9 and connects the linkages 8 and 9 that are arranged in the left-to-right direction X so as to be pivotable with respect to each other. The third joint J3 is movable in the longitudinal direction Z and the top-to-bottom direction Y with respect to the shaft 2 and the wire 3.

Figure 1B:
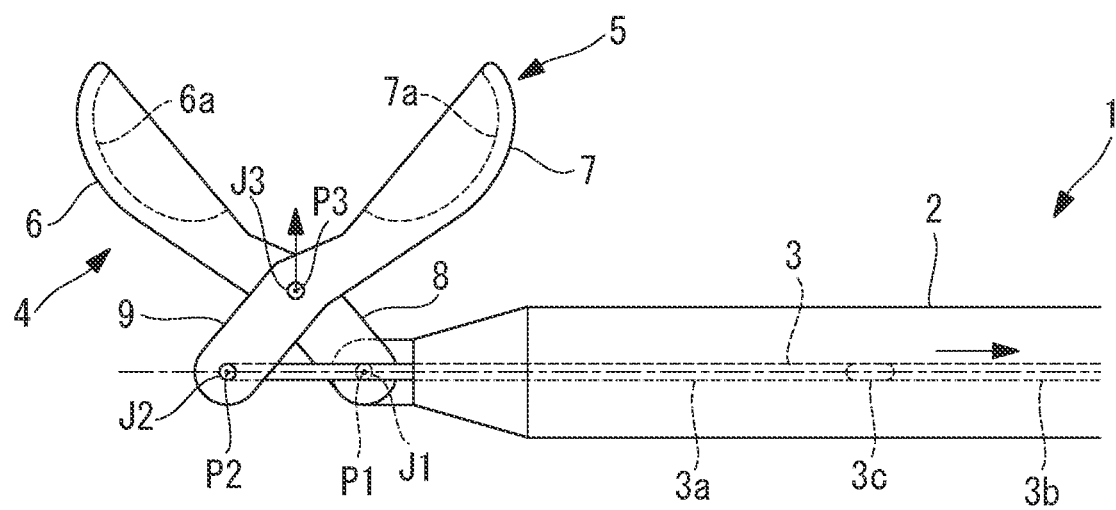
FIG. 1B is a side view for explaining the operation of the forceps in FIG. 1A, showing the pair of arms in an intermediate state.
Figure 1C:
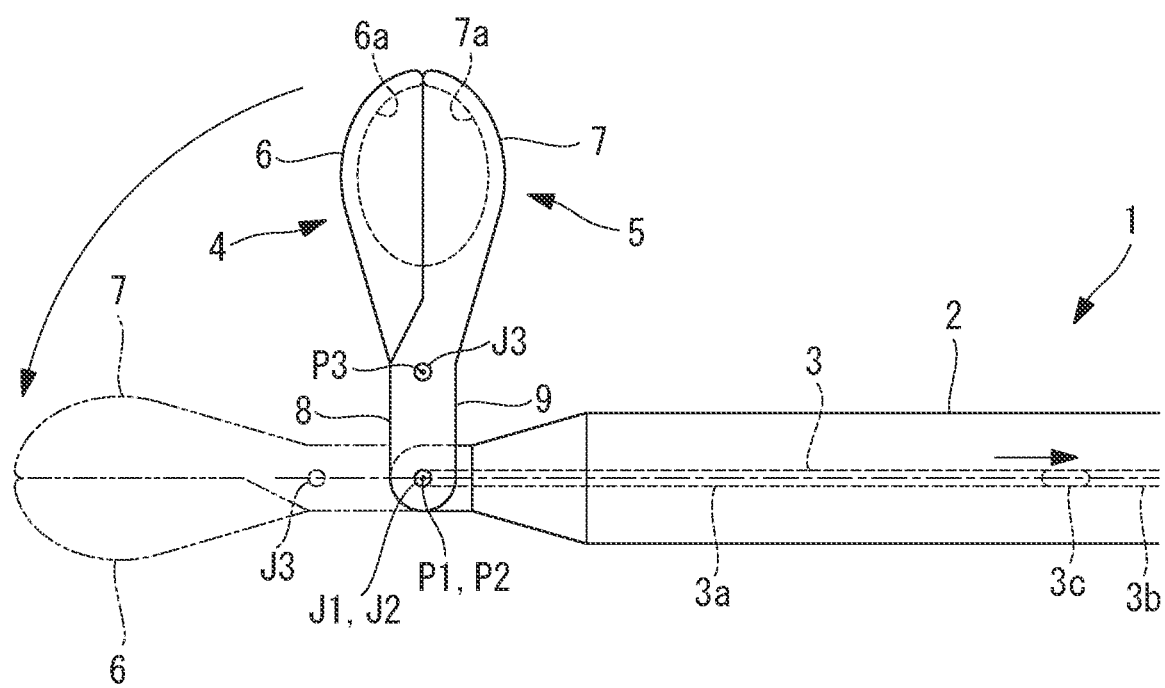
FIG. 1C is a side view for explaining the operation of the forceps in FIG. 1A, showing the pair of arms in a closed state.

FIG. 1A shows an open state in which the pair of jaws 6 and 7 are opened to the greatest extent, FIG. 10 shows a closed state in which the pair of jaws 6 and 7 are closed so as to reach positions at which the jaws 6 and 7 are in contact with each other, and FIG. 1B shows an intermediate state between the open state and the closed state.

The second joint J2 is movable with respect to the shaft 2 between an open position (see FIG. 1A) and a closed position (see FIG. 10). The open position is a position away from the distal end of the shaft 2 toward the distal side and is a position at which the pair of jaws 6 and 7 are disposed in the open state. The closed position is a position away from the open position toward the proximal side and is a position at which the pair of jaws 6 and 7 are disposed in the closed state.

By moving the second joint J2 in the longitudinal direction Z between the open position and the closed position by moving the wire 3, the pair of arms 4 and 5 are pivoted around the third axis P3 and the pair of jaws 6 and 7 are opened and closed.

Specifically, forward movement of the pushed wire 3 toward the distal side causes the second joint J2 to move in a direction away from the first joint J1 toward the open position. Accordingly, the pair of jaws 6 and 7 are pivoted in an opening direction in which said jaws 6 and 7 move away from each other and thereby the jaws 6 and 7 are opened.

In the open state, the distal end of the wire 3 protrudes from the distal end of the shaft 2, the second joint J2 is disposed on the distal side with respect to the first joint J1, and the two joints J1 and J2 are arranged in the longitudinal direction Z. In a side view viewed in the left-to-right direction X, which is parallel to the axes P1, P2, and P3, the two joints J1 and J2 in the open state are arranged on the longitudinal axis of the wire 3.

In addition, in the open state, the third joint J3 is disposed lateral to the wire 3 in the top-to-bottom direction Y and is disposed at a position away from the wire 3 on the pair of jaws 6 and 7 side (top side). Therefore, the pair of jaws 6 and 7 are disposed with the concave surfaces 6a and 7a thereof facing up.

On the other hand, backward movement of the pulled wire 3 toward the proximal side causes the second joint J2 to move in a direction in which said joint J2 approaches the first joint J1. Accordingly, the pair of jaws 6 and 7 are pivoted in a closing direction in which said jaws approach each other and are closed.

In the closed state, the pair of arms 4 and 5 extend upward from the shaft 2.

In addition, in the closed state, the second joint J2 overlaps with the first joint J1 in the left-to-right direction, and the position of the second joint J2 coincides with the position of the first joint J1 in the longitudinal direction Z. Specifically, because the axes P1 and P2 are coincident with each other in the closed state, the pair of arms 4 and 5 in the closed state can be rotated about the axes P1 and P2, as indicated by the two-dot chain line in FIG. 10.

Here, because the third joint J3 is movable with respect to the shaft 2 and the wire 3, the third joint J3 is moved upward (outward to the lateral direction) with respect to the shaft 2 and the wire 3 as the second joint J2 approaches the first joint J1. Accordingly, the pair of jaws 6 and 7 are closed while being moved upward together with the third joint J3.

Next, the tissue collection method using the forceps 1 will be described.

Figure 12A:
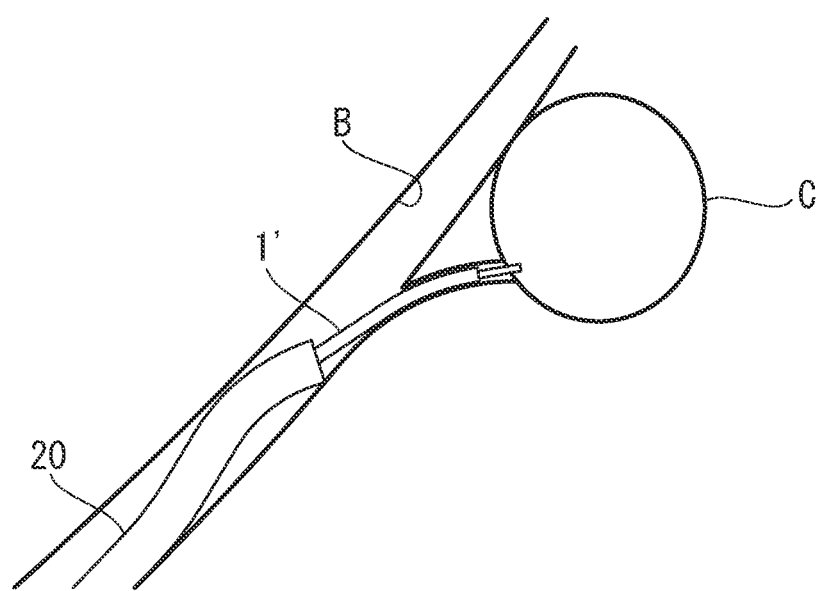
FIG. 12A is a diagram for explaining a positional relationship between forceps and a tumor in a method for collecting tumor tissue by means of the forceps in a bronchial cavity.
Figure 12B:
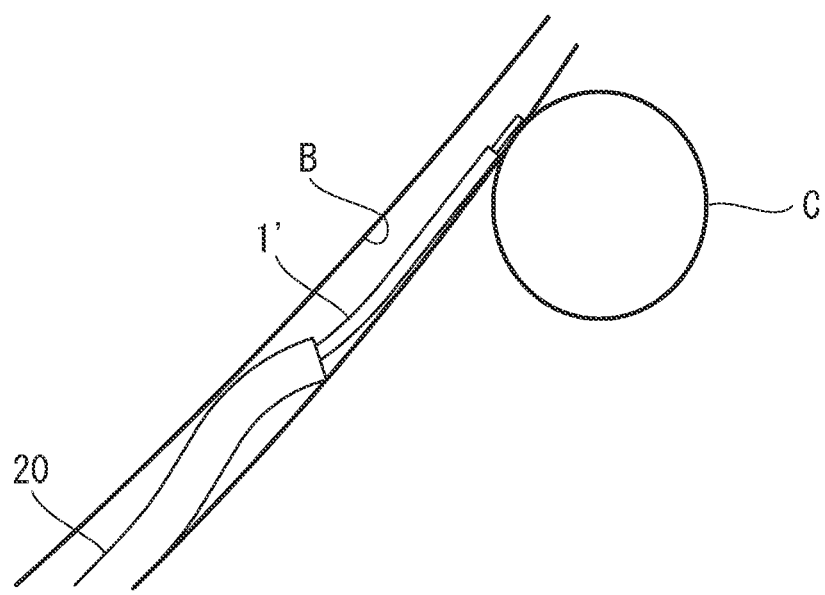
FIG. 12B is a diagram for explaining another positional relationship between the forceps and the tumor in the method for collecting the tumor tissue by means of the forceps in the bronchial cavity.

As shown in FIG. 12B, the forceps 1 according to this embodiment is used in collecting tissue of a lesion C adjacent to a body cavity B. In the following, a case in which tissue of a lesion C, such as a tumor, adjacent to the bronchus is collected from inside a bronchial cavity (body cavity) B will be described.

Figure 2:
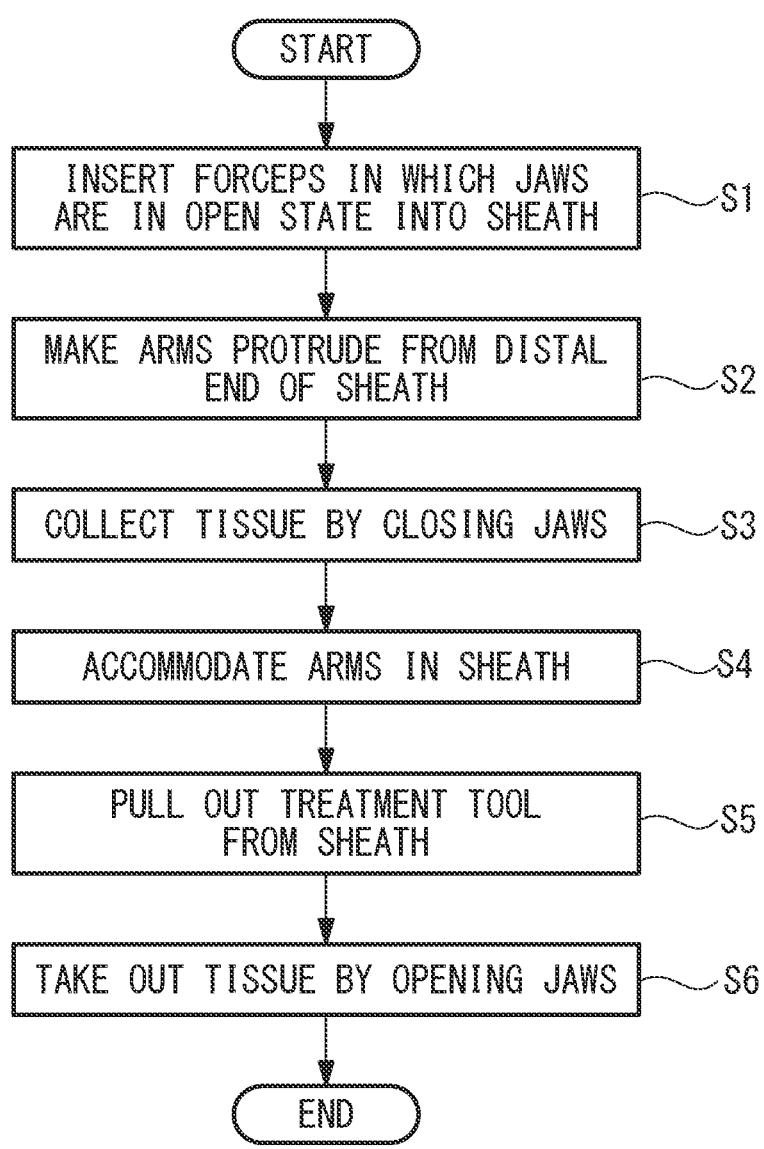
FIG. 2 is a flowchart of a tissue collection method according to an embodiment of the present invention.

As shown in FIG. 2, the tissue collection method according to this embodiment includes: step S1 for inserting the forceps 1 in which the pair of arms 4 and 5 are in the open state into a sheath 20; step S2 for making the pair of arms 4 and 5 protrude from a distal end of the sheath 20; step S3 for closing the pair of jaws 6 and 7 to collect tissue; step S4 for accommodating the pair of arms 4 and 5 in the closed state in the sheath 20; step S5 for pulling the forceps 1 out of the sheath 20; and step S6 for taking out the tissue from the pair of jaws 6 and 7.

The sheath 20 is inserted into the bronchial cavity B from an opening such as the mouth and is disposed at a position at which the distal end of the sheath 20 is placed adjacent to the lesion C. The positioning of the sheath 20 with respect to the lesion C is performed by using, for example, an ultrasound probe or the like inserted into the bronchial cavity B via the sheath 20.

In step S1, an operator, such as a doctor, puts the pair of arms 4 and 5 into the open state in which the pair of jaws 6 and 7 are open and subsequently inserts the forceps 1 into the sheath 20.

Figure 3A:
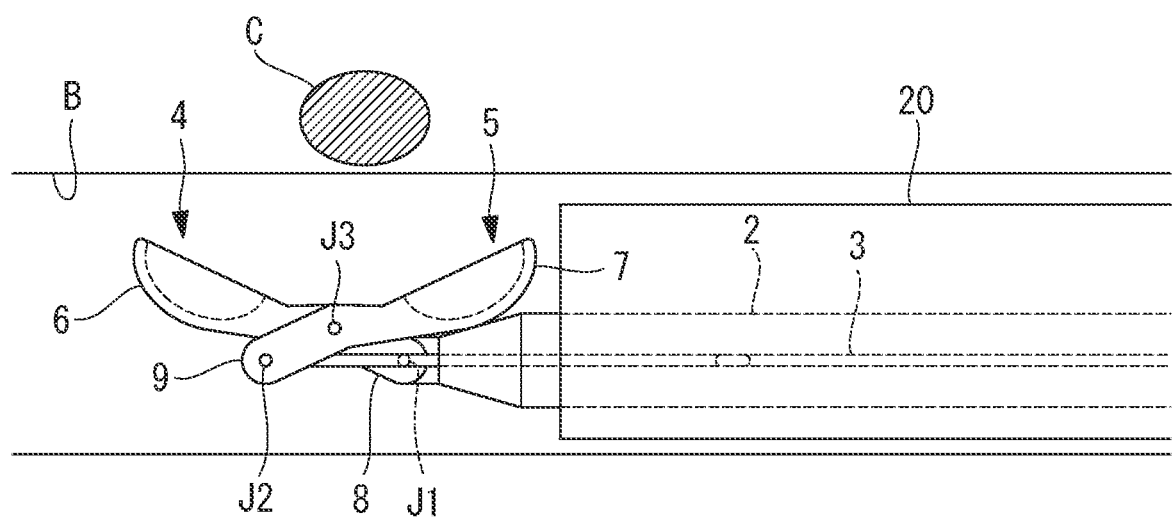
FIG. 3A is a diagram for explaining a tissue collection method using the forceps in FIG. 1A.

Next, in step S2, the operator moves the forceps 1 forward in the sheath 20 and makes the pair of arms 4 and 5 protrude from the distal end of the sheath 20, as shown in FIG. 3A. The protruded pair of arms 4 and 5 are disposed at the position adjacent to the lesion C and the open pair of jaws 6 and 7 are disposed facing the lesion C.

Figure 3B:
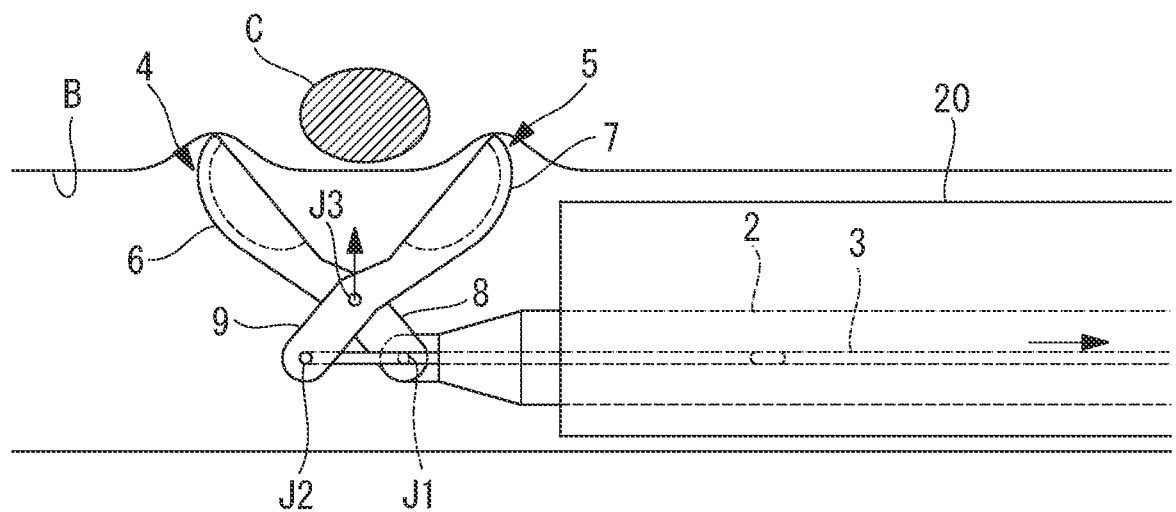
FIG. 3B is a diagram for explaining the tissue collection method using the forceps in FIG. 1A.
Figure 3C:
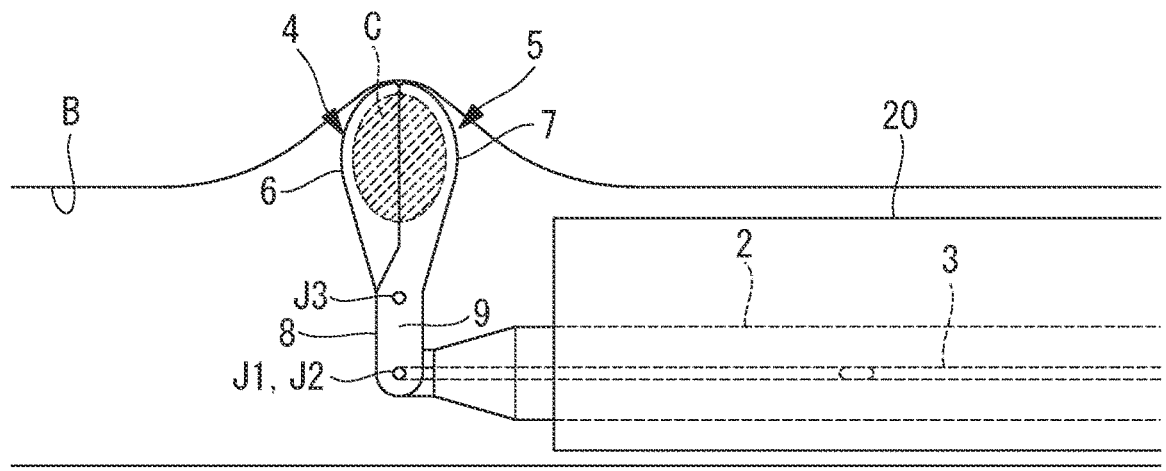
FIG. 3C is a diagram for explaining the tissue collection method using the forceps in FIG. 1A.

Next, in step S3, as shown in FIGS. 3B and 3C, the operator closes the pair of jaws 6 and 7 by pulling the wire 3 and thereby collects tissue of the lesion C in the pair of jaws 6 and 7. At this time, the pair of jaws 6 and 7 are closed while moving toward the lesion C and pushing the lesion C. Therefore, it is possible to firmly grab the lesion C by the pair of jaws 6 and 7 and to reliably and efficiently collect a large amount of the tissue in the closed pair of jaws 6 and 7.

Figure 3D:
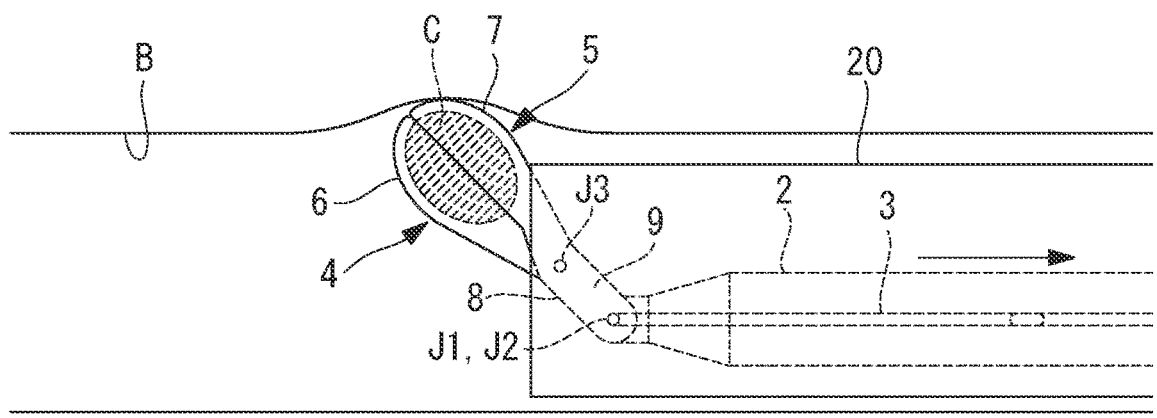
FIG. 3D is a diagram for explaining the tissue collection method using the forceps in FIG. 1A.
Figure 3E:
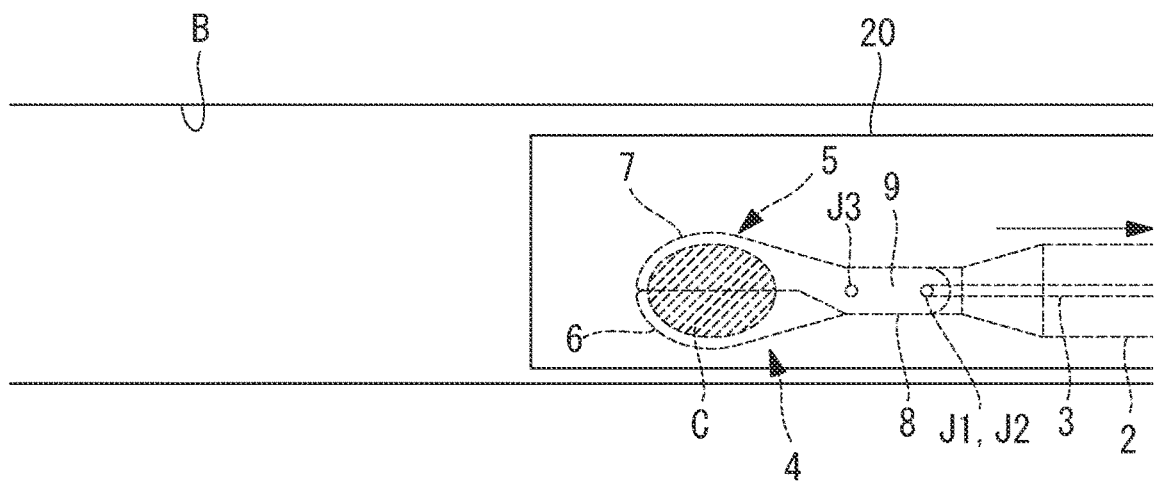
FIG. 3E is a diagram for explaining the tissue collection method using the forceps in FIG. 1A.

Next, in step S4, as shown in FIGS. 3D and 3E, the operator accommodates the pair of arms 4 and 5 in the closed state in the sheath 20 from the distal end thereof by pulling the shaft 2 of the forceps 1. At this time, the pair of arms 4 and 5 in the closed state are accommodated in the sheath 20 while rotating about the axes P1 and P2 and falling down due to contact with the distal end of the sheath 20.

Accordingly, the pair of arms 4 and 5 accommodated in the sheath 20 are disposed along the longitudinal direction Z.

Next, in step S5, the operator withdraws the forceps 1 from the sheath 20 by pulling the shaft 2 toward the proximal side and removes the forceps 1.

Next, in step S6, the operator opens the pair of jaws 6 and 7 outside the body and takes out the collected tissue from the jaws 6 and 7.

Figure 4A:
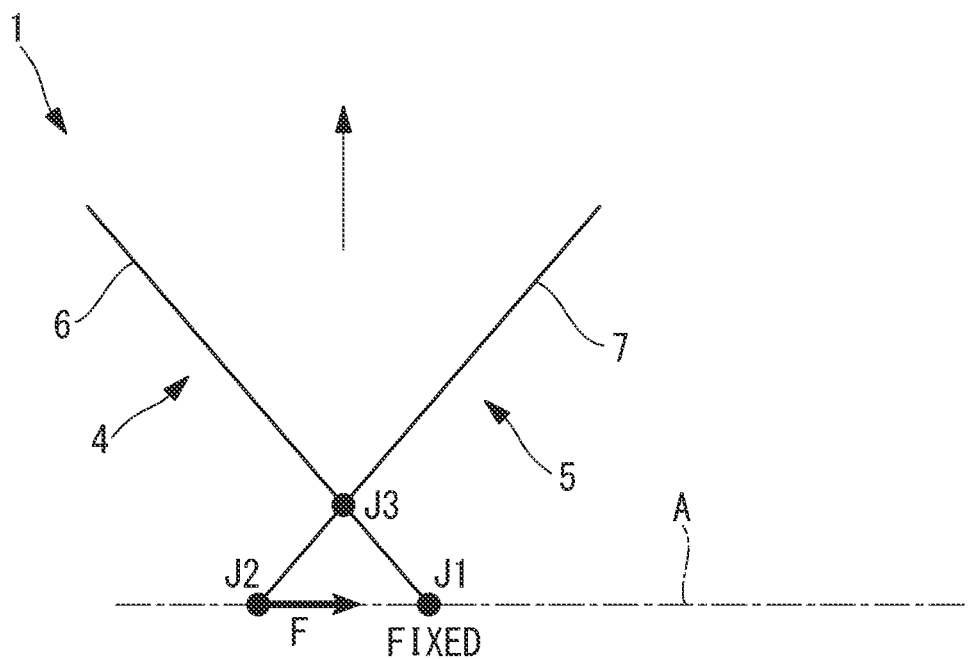
FIG. 4A is a schematic diagram of a linkage mechanism provided in the pair of arms in the forceps in FIG. 1A.
Figure 4A:
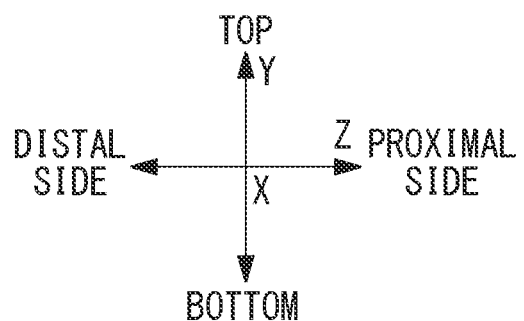
Figure 4B:
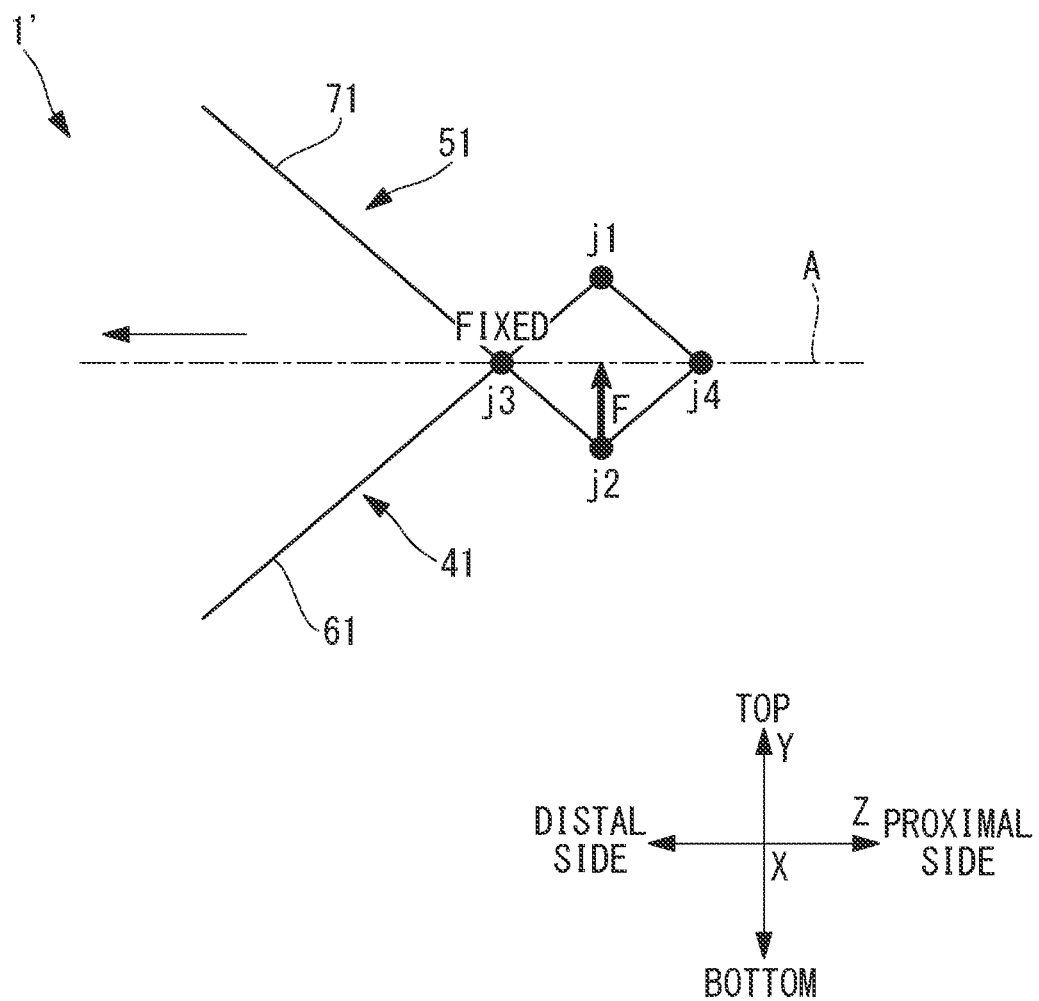
FIG. 4B is a schematic diagram of a linkage mechanism provided in a pair of arms in conventional forceps.

FIG. 4A shows a linkage mechanism of the pair of arms 4 and 5 in the forceps 1 of this embodiment, and FIG. 4B shows a linkage mechanism of a pair of arms 41 and 51 in conventional, general forceps 1'. As shown in FIGS. 4A and 4B, the forceps 1 of this embodiment differs from the conventional forceps 1' in terms of arrangements and movements of the joints J1, J2, and J3 and the opening and closing directions of the pair of jaws 6 and 7. The arrow F indicates a force applied to the joint J2 or a joint j2 from the wire 3.

Specifically, in the conventional forceps 1', a joint j3 is fixed on an extension (longitudinal direction Z) of the center axis A of the shaft 2. A pair of jaws 61 and 71 are open facing forward with respect to the center axis A of the shaft 2, and the pair of jaws 61 and 71 are opened and closed in a lateral direction and are closed forward as a result of the second joint j2 being moved with respect to a first joint j1 in the lateral direction that intersects the center axis A (the top-to-bottom direction in FIG. 4B).

In contrast, in the forceps 1 of this embodiment, the third joint J3 is disposed lateral to the center axis A of the shaft 2 (above the axis A in FIG. 4A) and is movable with respect to the shaft 2. The pair of jaws 6 and 7 are open outward in a lateral direction (upward), and the pair of jaws 6 and 7 are opened and closed in the longitudinal direction Z and are closed toward laterally as a result of the second joint J2 being moved with respect to the first joint J1 in the longitudinal direction.

In the case of the conventional forceps 1', described above, it is not possible to open and close the pair of jaws 6 and 7 in a bronchial cavity B toward a lesion C adjacent to the bronchial cavity B. Therefore, it is difficult to collect a sufficient amount of tissue of the adjacent lesion C by means of the conventional forceps 1'.

In contrast, with this embodiment, the pair of jaws 6 and 7 are open outward in the lateral direction with respect to the shaft 2 and are closed while being moved outward in the lateral direction. Therefore, it is possible to efficiently collect the tissue of the lesion C by means of the closing jaws 6 and 7, while pushing the jaws 6 and 7 into the adjacent lesion C.

In the configuration of the forceps 1 of this embodiment, the position of the second joint J2 could become unstable in the case in which the wire 3 possesses flexibility over the entire length thereof. For example, when the wire 3 is moved in the longitudinal direction Z, the second joint J2 is not necessarily linearly moved in the longitudinal direction Z, and the second joint J2 could be displaced in the lateral direction X, Y. In order to ensure stable opening and closing operations of the pair of jaws 6 and 7, it is preferable that the second joint J2 be linearly moved in the longitudinal direction Z.

Therefore, as shown in FIGS. 1A to 10 and FIGS. 5A to 6B, the forceps 1 may include a linear movement mechanism that causes the second joint J2 to be linearly moved in the longitudinal direction Z of the shaft 2.

In FIGS. 1A to 10, the linear movement mechanism is formed from a rigid distal-side portion 3a of the wire 3 that is disposed between the joints J1 and J2. Specifically, the wire 3 has the rigid portion 3a and a flexible portion 3b formed from the other portion possessing flexibility. The rigid portion 3a and the flexible portion 3b are connected to each other via a connecting portion 3c.

Figure 5A:
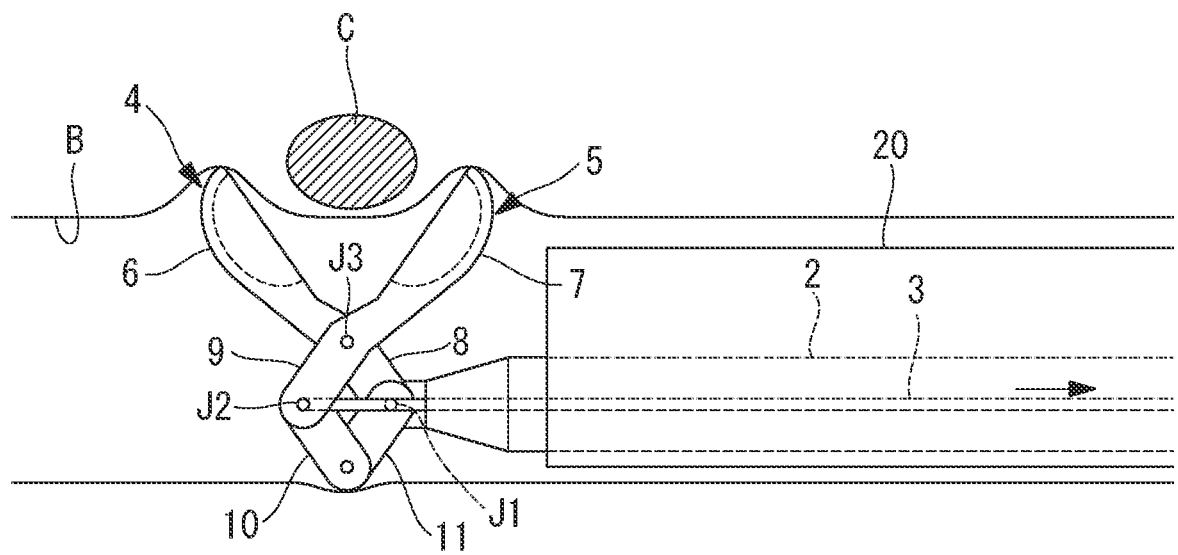
FIG. 5A is a diagram for explaining a tissue collection method using a modification of the forceps in FIG. 1A.
Figure 5B:
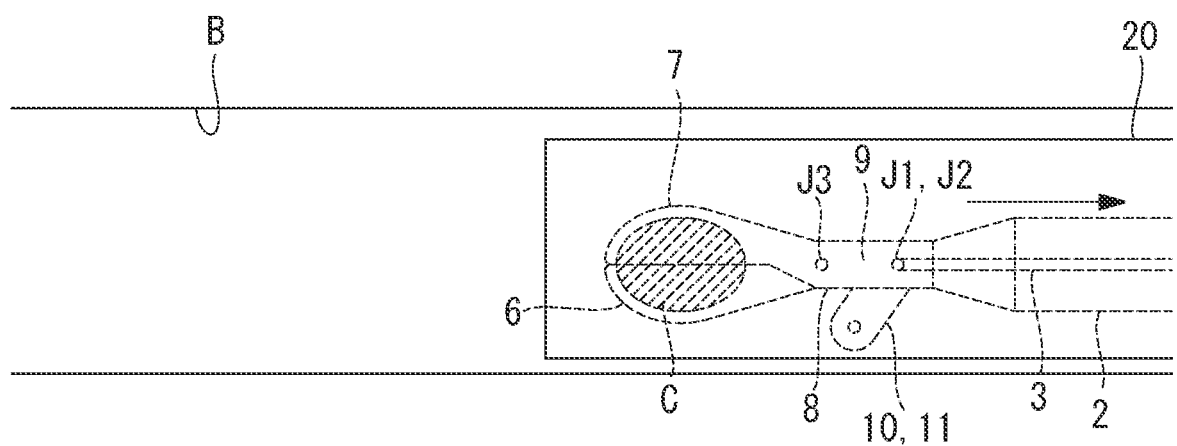
FIG. 5B is a diagram for explaining the tissue collection method using the modification of the forceps in FIG. 1A.

In FIGS. 5A and 5B, the linear movement mechanism has linkages 10 and 11 that is provided in the arms 4 and 5 on the opposite side from the jaws 6 and 7 and that connect the linkages 8 and 9. For example, the four linkages 8, 9, 10, and 11 form a diamond-shaped linkage mechanism that causes the second joint J2 to be linearly moved.

In this configuration, as shown in FIG. 5A, the linkages 10 and 11 push an inner wall of the body cavity B on the opposite side from the lesion C when closing the pair of jaws 6 and 7. Accordingly, it is possible to push the pair of jaws 6 and 7 into the lesion C with a greater force.

Figure 6A:
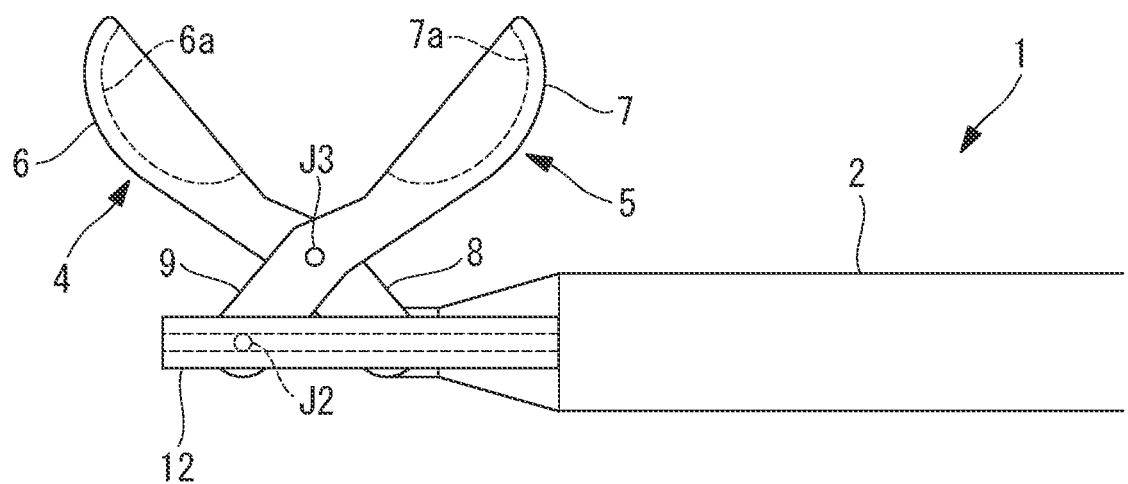
FIG. 6A is a side view of another modification of the forceps in FIG. 1A.
Figure 6B:
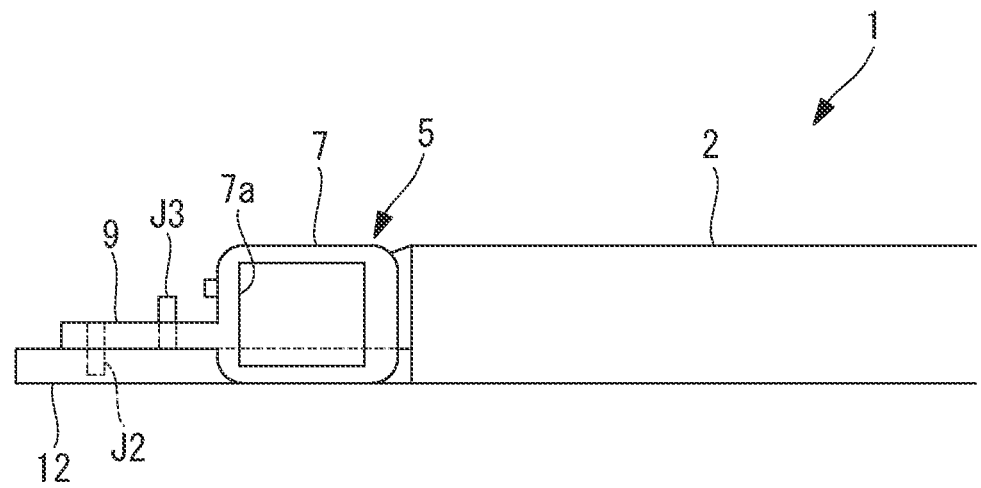
FIG. 6B is a top view of the forceps in FIG. 6A.

In FIGS. 6A and 6B, the linear movement mechanism has a rigid rail 12 that guides the second joint J2 in the longitudinal direction Z. The rail 12 extends towards the distal side in the longitudinal direction Z from the shaft 2 and is fixed to the shaft 2. The rail 12 supports the end portion of the second joint J2 protruding from the second linkage 9 so as to be movable in the longitudinal direction Z. In FIG. 6B, the illustration of the first arm 4 is omitted.

In the case in which the linear movement mechanism in FIGS. 5A to 6B is provided, the distal-end portion of the wire 3 may possess flexibility.

In the above-described embodiment, the second joint J2 is stationary with respect to the second arm 5; alternatively, however, the second joint J2 may be movable with respect to the second arm 5. Specifically, as shown in FIGS. 7A to 7D, the second arm 5 may have a slot 13 that supports the second joint J2 in a slidable manner. In FIGS. 7A to 7D, the illustration of the shaft 2 is omitted.

After collecting tissue in the closed pair of jaws 6 and 7, in order to prevent the pair of jaws 6 and 7 from unintentionally opening and causing the tissue to fall out from the jaws 6 and 7, it is preferable to firmly close the pair of jaws 6 and 7 by acting an additional closing-direction torque T on the pair of jaws 6 and 7 in the closed state.

In the case of the configuration of the forceps 1 in FIG. 1A, in the state in which the pair of arms 4 and 5 in the closed state falls down (see FIG. 3E), the third joint J3 is disposed on an extension of the line of action of the pulling force F that acts on the second joint J2 from the wire 3. Therefore, even if the wire 3 is further pulled in this state, it is not possible to exert the additional torque T on the second jaw 7. The slot 13 is provided to eliminate this problem.

The slot 13 has a first terminal end 13a and a second terminal end 13b, at which the slot 13 is terminated, and extends between the terminal ends 13a and 13b. The slot 13 supports the second joint J2 so as to be slidable between the terminal ends 13a and 13b. The first terminal end 13a and the second terminal end 13b are provided at positions that satisfy the conditions described below.

Figure 7A:
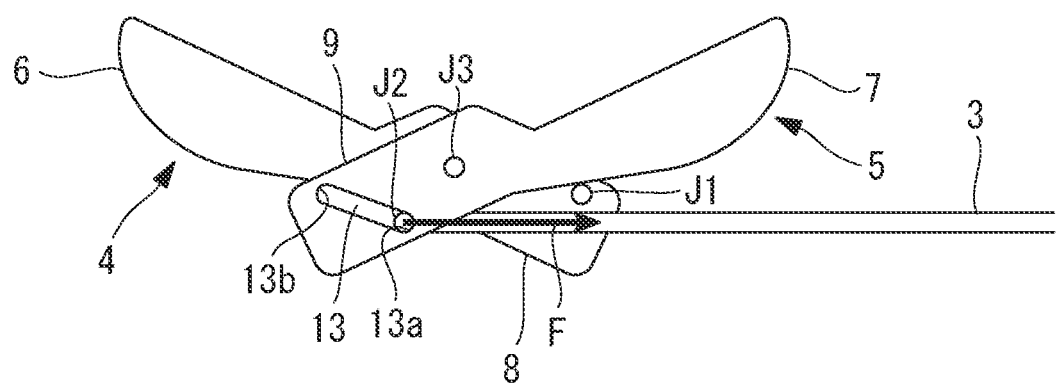
FIG. 7A is a side view of another modification of the forceps in FIG. 1A, showing a pair of arms thereof in an open state.

Specifically, as shown in FIG. 7A, in the open state, the first terminal end 13a is offset in the top-to-bottom direction (specifically, toward the bottom side) with respect to the third joint J3 and is disposed at a position farther on the proximal side than the second terminal end 13b. As shown in FIG. 7D, in a horizontal state in which the pair of arms 4 and 5 in the closed state are disposed along the longitudinal direction Z, the second terminal end 13b is offset in the top-to-bottom direction (specifically, toward the bottom side) with respect to the third joint J3 and is disposed at a position farther on the proximal side than the first terminal end 13a.

Figure 7B:
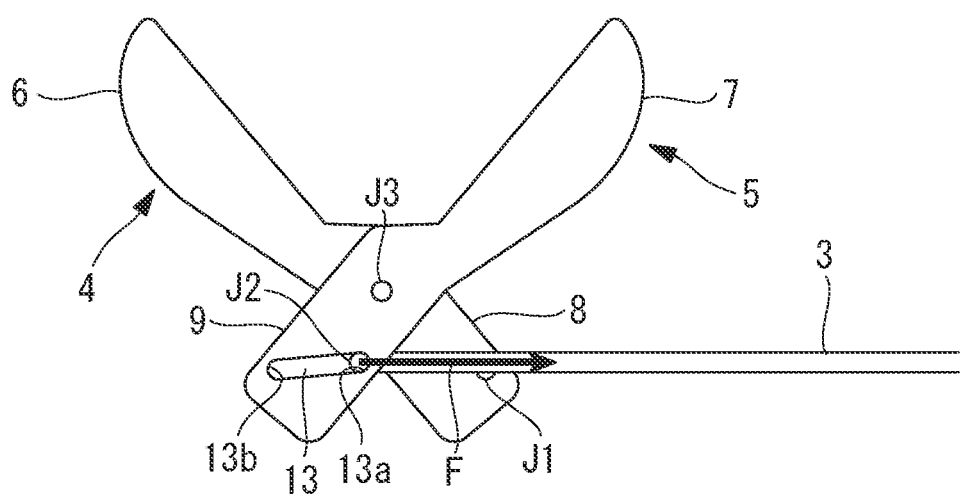
FIG. 7B is a side view for explaining the operation of the forceps in FIG. 7A, showing the pair of arms in an intermediate state.
Figure 7C:
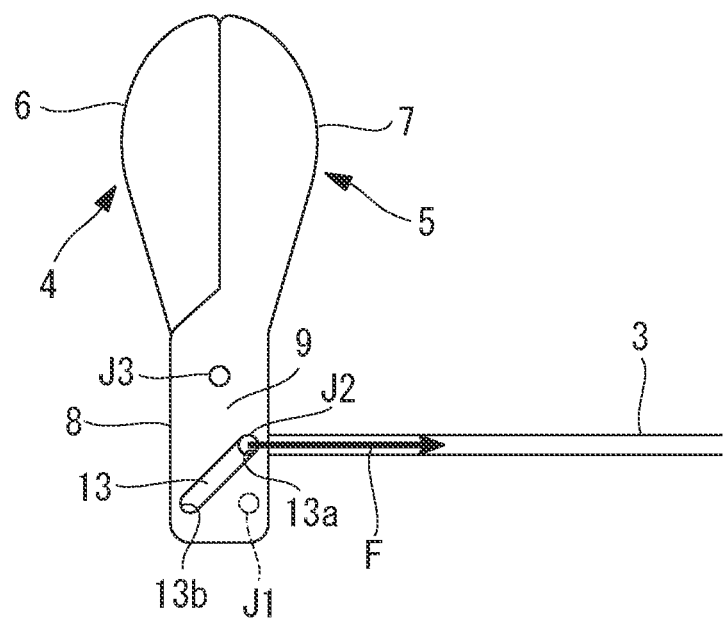
FIG. 7C is a side view for explaining the operation of the forceps in FIG. 7A, showing the pair of arms in a closed state.
Figure 7D:
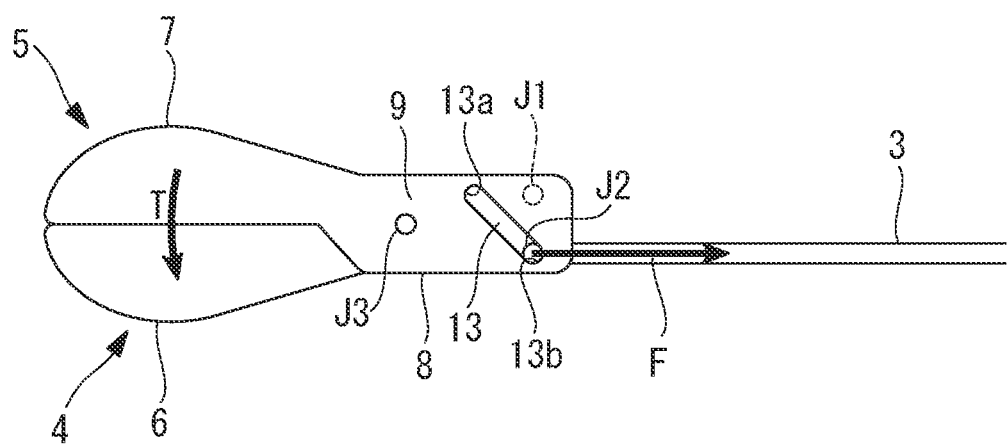
FIG. 7D is a side view for explaining the operation of the forceps in FIG. 7A, showing the pair of arms in a horizontal state.

As shown in FIGS. 7A to 7C, when the second joint J2 connected to the distal end of the wire 3 is moved from the open position to the closed position, the second joint J2 is disposed at the first terminal end 13a in the slot 13. In the closed state of this modification, the second joint J2 is disposed at a different position from the first joint J1 and the pair of arms 4 and 5 in the closed state are rotatable about the first axis P1.

Subsequently, as shown in FIG. 7D, in the process of the pair of arms 4 and 5 in the closed state falling down, the second joint J2 slides from the first terminal end 13a to the second terminal end 13b in the slot 13 in accordance with the pulling force F exerted from the wire 3. In the horizontal state in which the pair of arms 4 and 5 in the closed state are disposed along the longitudinal direction Z, the second joint J2 positioned at the second terminal end 13b is disposed farther on the bottom side than the third joint J3.

Therefore, it is possible to exert the closing-direction torque T about the third joint J3 on the second arm 5 due to the pulling force F and thereby it is possible to firmly close the pair of jaws 6 and 7.

Figure 8A:
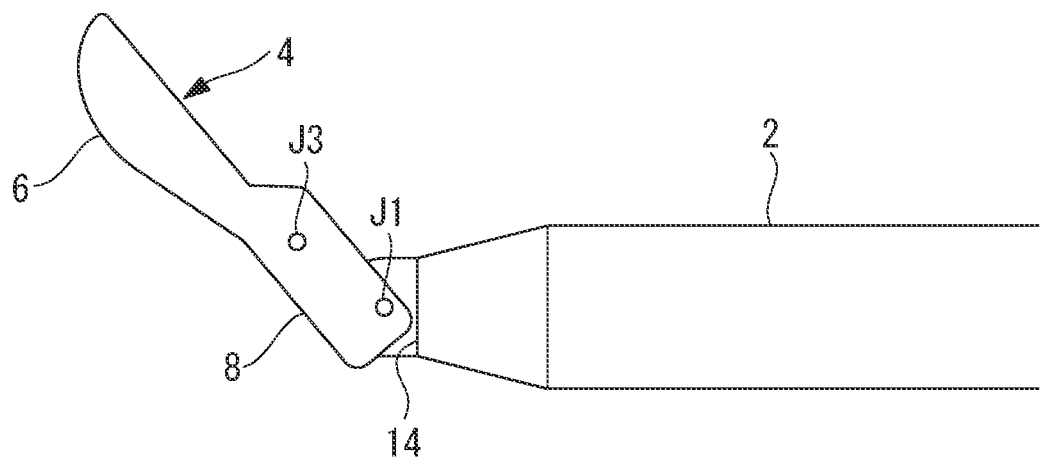
FIG. 8A is a side view for explaining a stopper structure provided in the forceps in FIG. 7A.
Figure 8B:
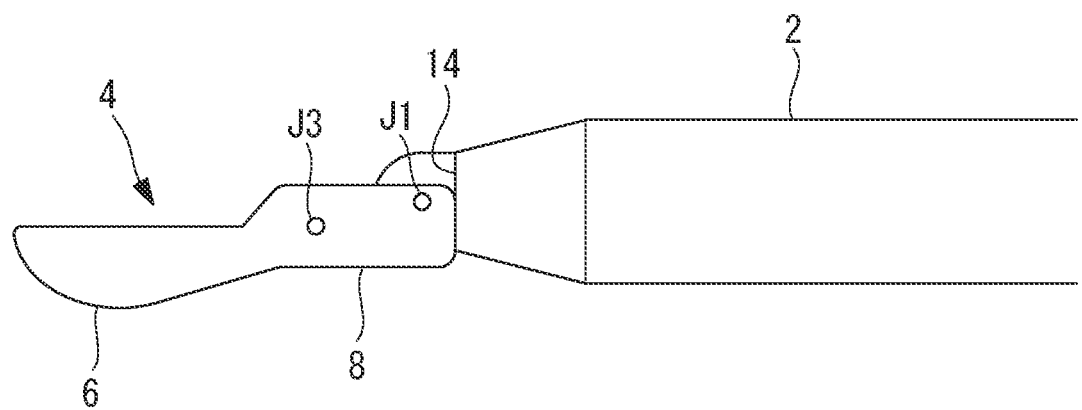
FIG. 8B is a side view for explaining the stopper structure provided in the forceps in FIG. 7A.
Figure 8C:
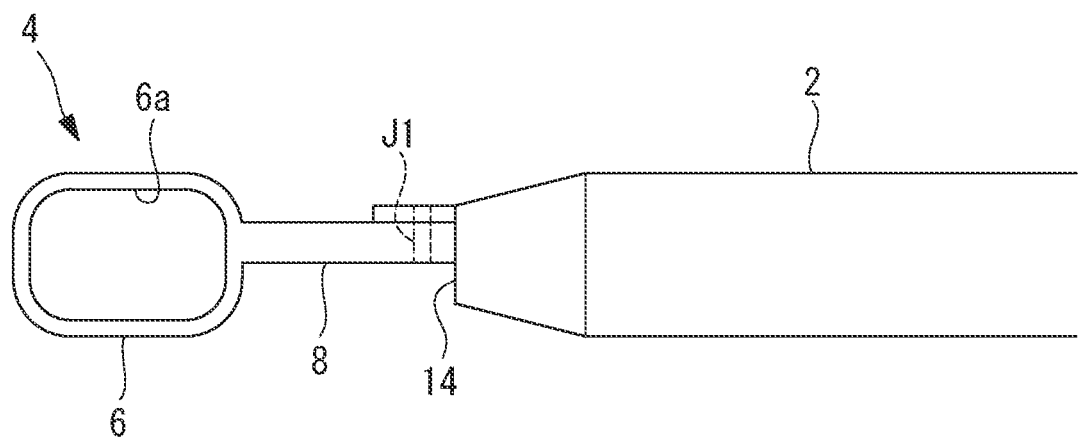
FIG. 8C is a top view in which the forceps in FIG. 8B are viewed from a top side.

In order to firmly close the pair of jaws 6 and 7 by means of the torque T, the first arm 4 needs to resist the torque T so as not to be rotated. Therefore, as shown in FIGS. 8A to 8C, it is preferable to provide a stopper structure that prevents a further rotation of the first arm 4 when the pair of arms 4 and 5 in the closed state are rotated to a horizontal position. The horizontal position refers to a position at which the arms 4 and 5 are disposed along the longitudinal direction Z. In FIGS. 8A to 8C, the illustrations of the wire 3 and the second arm 5 are omitted.

In one example configuration, the stopper structure has a stopper 14 provided in the shaft 2. In FIGS. 8A to 8C, the stopper 14 consists of a distal-end surface of the shaft 2. As shown in FIGS. 8B and 8C, when the first arm 4 is rotated to the closed position, the rotation of the pair of arms 4 and 5 in the closed state is prevented as a result of the an end surface of the second side of the first arm 4 abutting against the stopper 14. Accordingly, while the pulling force F is being exerted, it is possible to continue to firmly close the pair of jaws 6 and 7 by maintaining the pair of arms 4 and 5 in the closed state at the horizontal position.

In FIGS. 7A to 7D, the slot 13 has a linear shape; however, so long as it is possible for the second joint to smoothly slide from the first terminal end 13a to the second terminal end 13b in accordance with the pulling force F, the slot 13 may have a shape other than the linear shape, and may have, for example, an arc shape.

In the above-described embodiment, the forceps 1 may further include a locking mechanism that locks the pair of arms 4 and 5 so that the pair of jaws 6 and 7 do not re-open when the pair of jaws 6 and 7 are closed. By providing the locking mechanism, it is possible to prevent the collected tissue from falling out from the jaws 6 and 7, and it is possible to reliably take all of the tissue that has already been collected in the jaws 6 and 7 out of the body.

As shown in FIGS. 9A to 10C, the locking mechanism has an engaged portion 15A provided in one of the pair of arms 4 and 5 and an engaging portion 15B provided in the other one of the pair of arms 4 and 5. In this example, the engaged portion 15A is provided in the first arm 4 and the engaging portion 15B is provided in the second arm 5.

Figure 9A:
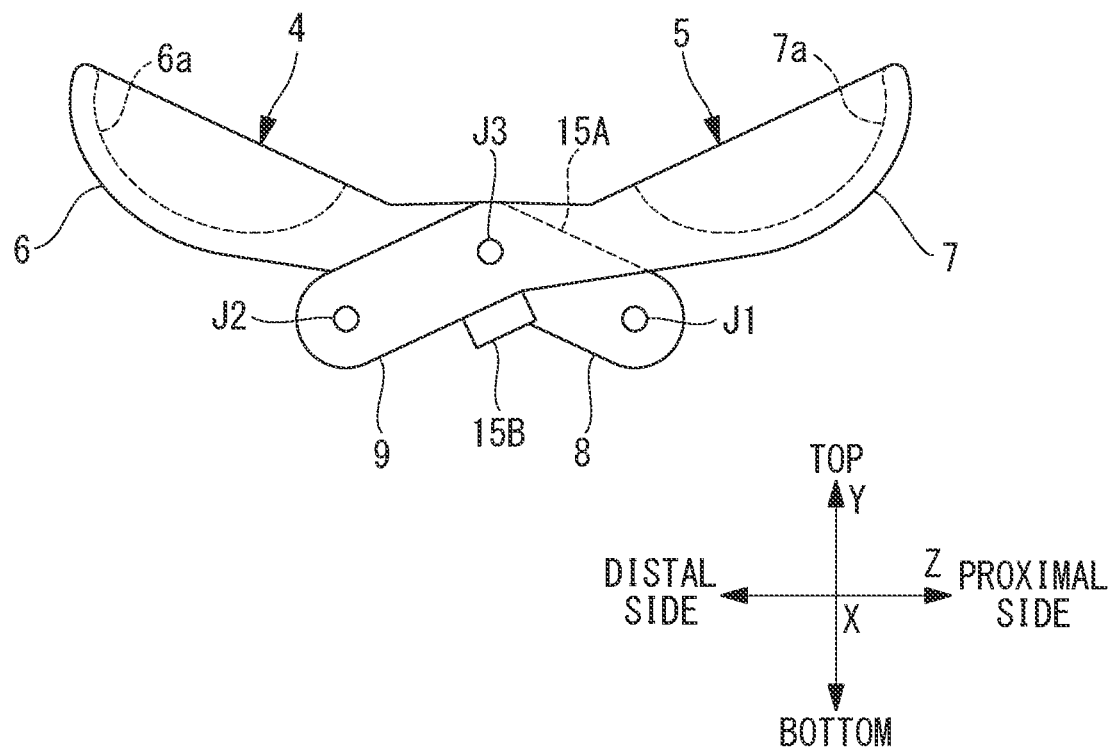
FIG. 9A is a side view of a pair of arms in another modification of the forceps in FIG. 1A, showing the pair of arms in an open state.
Figure 9B:
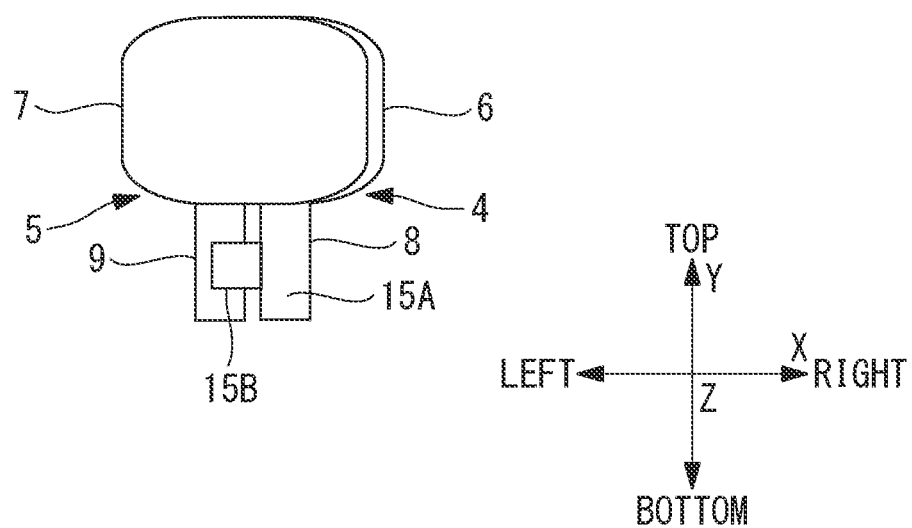
FIG. 9B is a back view in which the pair of arms in FIG. 9A are viewed from a proximal side.

In the open state, the engaging portion 15B is secured to a side surface on the proximal side of the second linkage 9 and protrudes toward the first linkage 8 side in the left-to-right direction X. FIG. 9B is a diagram in which the arms 4 and 5 in FIG. 9A are viewed from the proximal side. The engaging portion 15B is formed from, for example, an elastic material. In the open state, there is a gap in the left-to-right direction X between the linkages 8 and 9, and the engaging portion 15B is in contact with the second linkage 9. The third joint J3 exerts a force to the pair of arms 4 and 5 in a direction in which the arms 4 and 5 approach each other. Therefore, the pair of jaws 6 and 7 are closed while the engaging portion 15B slides on a surface of the first linkage 8.

Figure 10A:
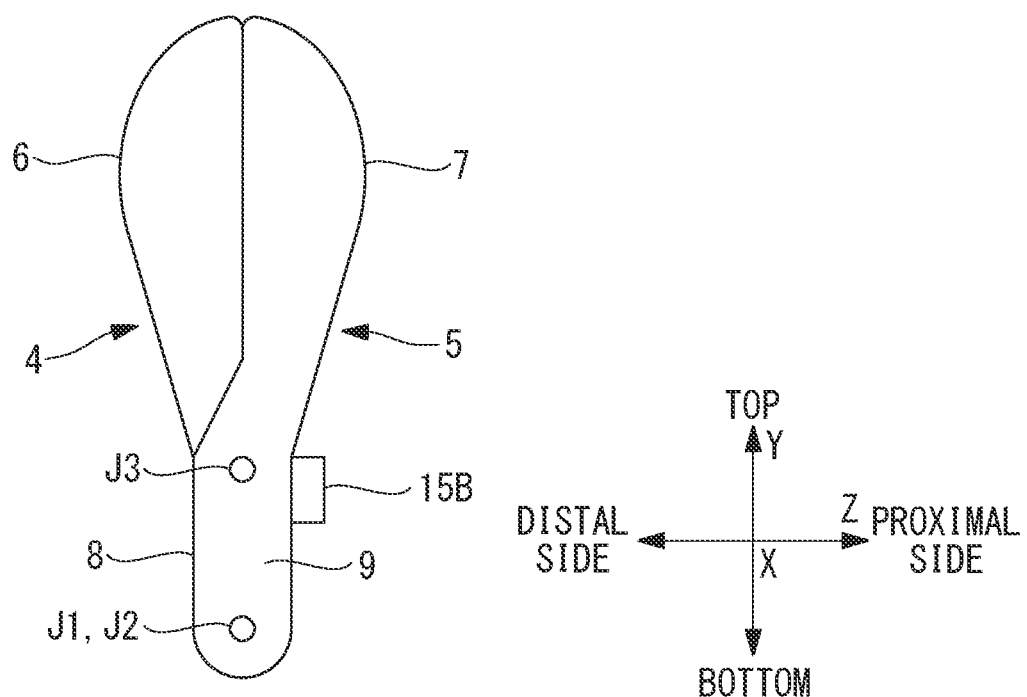
FIG. 10A shows the forceps in FIG. 9A in a closed state.
Figure 10B:
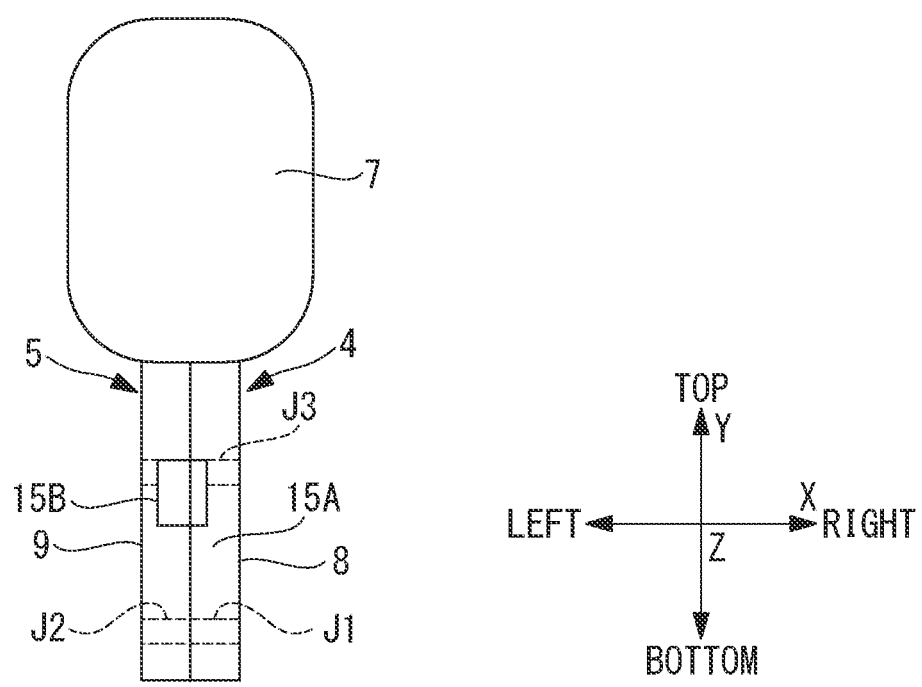
FIG. 10B is a back view in which the pair of arms in FIG. 10A are viewed from a proximal side.
Figure 10C:
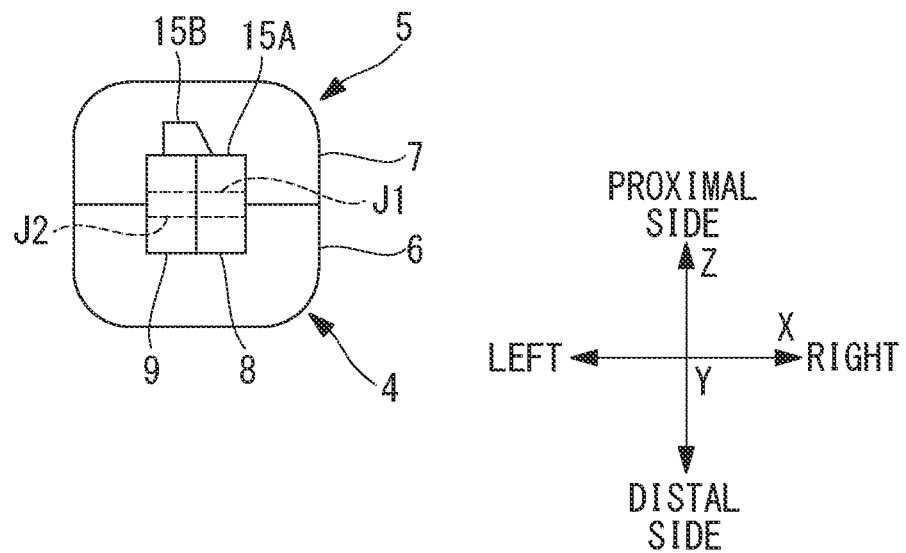
FIG. 10C is a bottom view in which the pair of arms in FIG. 10A are viewed from a bottom side.

As shown in FIGS. 10A to 10C, when the pair of jaws 6 and 7 are closed until achieving the closed state, as a result of the engaging portion 15B passing over the first linkage 8, the linkages 8 and 9 approach each other in the left-to-right direction X, and the engaging portion 15B is engaged with a surface on the proximal side of the first linkage 8, which is the engaged portion 15A. Accordingly, the pair of arms 4 and 5 are locked so that the pair of jaws 6 and 7 do not open. FIG. 10B is a diagram in which the arms 4 and 5 in FIG. 10A are viewed from the proximal side, and FIG. 10O is a diagram in which the arms 4 and 5 in FIG. 10A are viewed from the bottom side.

Note that the engaged portion 15A and the engaging portion 15B in FIGS. 9A to 10C are merely examples, and, so long as the engaged portion 15A and the engaging portion 15B engage with each other when the pair of jaws 6 and 7 are closed, the engaged portion 15A and the engaging portion 15B may take other forms.

Figure 11A:
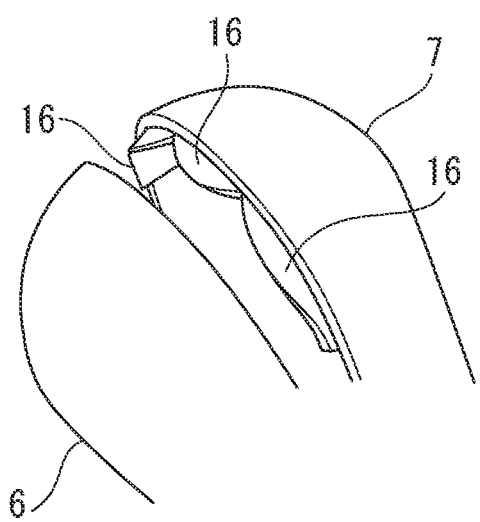
FIG. 11A is a perspective view of a modification of a pair of jaws.
Figure 11B:
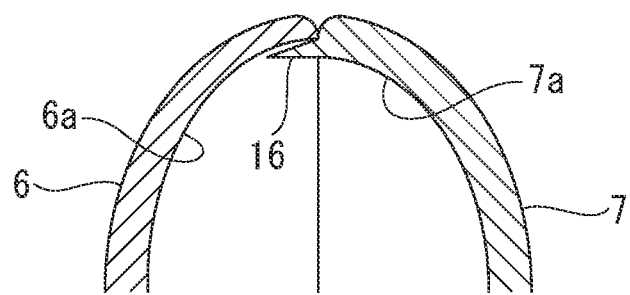
FIG. 11B is a sectional view of the pair of jaws in FIG. 11A in a closed state.

In the above-described embodiment, as shown in FIGS. 11A and 11B, at least one of the jaws 6 and 7 may have teeth 16.

In FIGS. 11A and 11B, the teeth 16 are provided along an outer edge of the concave surface 7a at an end portion of the first side of the jaw 7. In the closed state, the teeth 16 protrude toward the jaw 6 and engage with the concave surface 6a. With such teeth 16, it is possible to prevent tissue from falling out of the jaws 6 and 7 and it is possible to easily cut the tissue by means of the sharp teeth 16. The shape of the teeth 16 shown in FIGS. 11A and 11B is merely an example, and the teeth 16 may have other arbitrary shapes.

In the above-described embodiment, the forceps 1 is the biopsy forceps having cups as the jaws 6 and 7; alternatively, however, the forceps 1 may be other types of forceps such as gripping forceps or hemostatic forceps. The jaws 6 and 7 are appropriately designed in accordance with the type of forceps. In addition, the shaft 2 and the wire 3 may be rigid in accordance with the usage of the forceps 1.

In addition, the present invention is not limited to forceps and may be applied to an arbitrary type of treatment tool having a pair of jaws that open and close with respect to each other, for example, scissors or the like.

In the above-described embodiment, the forceps 1 is used in combination with the sheath 20; however, the sheath 20 is not necessarily required. For example, an endoscope may be used instead of the sheath 20, and the forceps 1 may be inserted into a body cavity via a treatment tool channel of the endoscope. Alternatively, the forceps 1 may be inserted into the body cavity by themselves.

REFERENCE SIGNS LIST

1 forceps
2 shaft
3 wire
3a rigid portion
4 first arm
5 second arm
6 first jaw
7 second jaw
13 slot
13a first terminal end
13b second terminal end
15A engaged portion, locking mechanism
15B engaging portion, locking mechanism
20 sheath
B bronchial cavity, body cavity
J1 first joint
J2 second joint
J3 third joint

The invention claimed is:

1. A forceps comprising:
an elongated shaft;
an elongated wire that is disposed inside the elongated shaft and that is movable in a longitudinal direction of the elongated shaft;
a first arm that is disposed on a distal side of the elongated shaft and that has a first jaw, the first arm being directly connected to a distal end of the elongated shaft in a pivotable manner by a first joint; and
a second arm that is disposed on the distal side of the elongated shaft and that has a second jaw, the second arm being directly connected to a distal end of the elongated wire in a pivotable manner by a second joint, wherein
the first arm and the second arm are connected to each other in a pivotable manner by a third joint and the third joint is provided between the first jaw and the first joint and between the second jaw and the second joint,
movement of the elongated wire causes the second joint to move along the axial direction of the elongated wire with respect to the first joint, thereby opening and closing the first jaw and the second jaw with respect to each other,
the third joint is disposed lateral to a longitudinal axis of the elongated wire in a state in which the first jaw and the second jaw are open, and
the first jaw and the second jaw are closed while the third joint is moved outward with respect to the elongated shaft from a lateral direction of the longitudinal axis of the elongated wire toward the longitudinal axis of the elongated wire.

2. The forceps according to claim 1, wherein:
in the state in which the first jaw and the second jaw are open, the first joint and the second joint are arranged along the longitudinal axis of the elongated wire, and the third joint is disposed at a position away from the longitudinal axis of the elongated wire on the first and second jaws side in the lateral direction; and
the second joint is linearly moved along the longitudinal axis of the elongated wire due to the movement of the elongated wire.

3. The forceps according to claim 1, wherein, in a state in which the first jaw and the second jaw are closed, the position of the second joint coincides with the position of the first joint the longitudinal axis of the elongated wire.

4. The forceps according to claim 1, wherein a first portion of the elongated wire disposed between the first joint and the second joint is more rigid than a second portion of the elongated wire proximal to the first portion.

5. The forceps according to claim 1, wherein:
the second arm has a slot that has a first terminal end and a second terminal end and that supports the second joint between the first terminal end and the second terminal end in a slidable manner;
in the state in which the first jaw and the second jaw are open, the first terminal end is offset in the lateral direction with respect to the third joint and is disposed at a position farther on the proximal side than the second terminal end; and, in a state in which the first jaw and the second jaw are closed and the first arm and the second arm are disposed along the axial direction of the elongated wire, the second terminal end is offset in the lateral direction with respect to the third joint and is disposed at a position farther on the proximal side than the first terminal end.

6. The forceps according to claim 1, further comprising a locking mechanism that locks the first arm and the second arm when the first jaw and the second jaw are closed, wherein the locking mechanism has an engaged portion that is provided in one of the first arm and the second arm, and an engaging portion that is provided in the other one of the first arm and the second arm, and, when the first jaw and the second jaw are closed, the engaging portion hooks to the engaged portion and locks the first jaw and the second jaw in a closed state.

7. A tissue collection method using the forceps according to claim 1, the method comprising:

inserting the forceps in which the first jaw and the second jaw are open into a sheath disposed inside a body cavity;

making the first arm and the second arm protrude from the distal end of the sheath;

closing the first jaw and the second jaw to collect tissue by moving the elongated wire in the longitudinal direction;

accommodating the first arm and the second arm in which the first jaw and the second jaw are closed in the sheath by pulling the elongated shaft;

pulling the forceps out of the sheath; and taking out the tissue from the first jaw and the second jaw by opening the first jaw and the second jaw.

* * * * *